Feb. 8, 1955      J. C. BORGER      2,701,408
METHOD OF COLD FORMING SHEETS
Filed Nov. 19, 1951      2 Sheets-Sheet 2
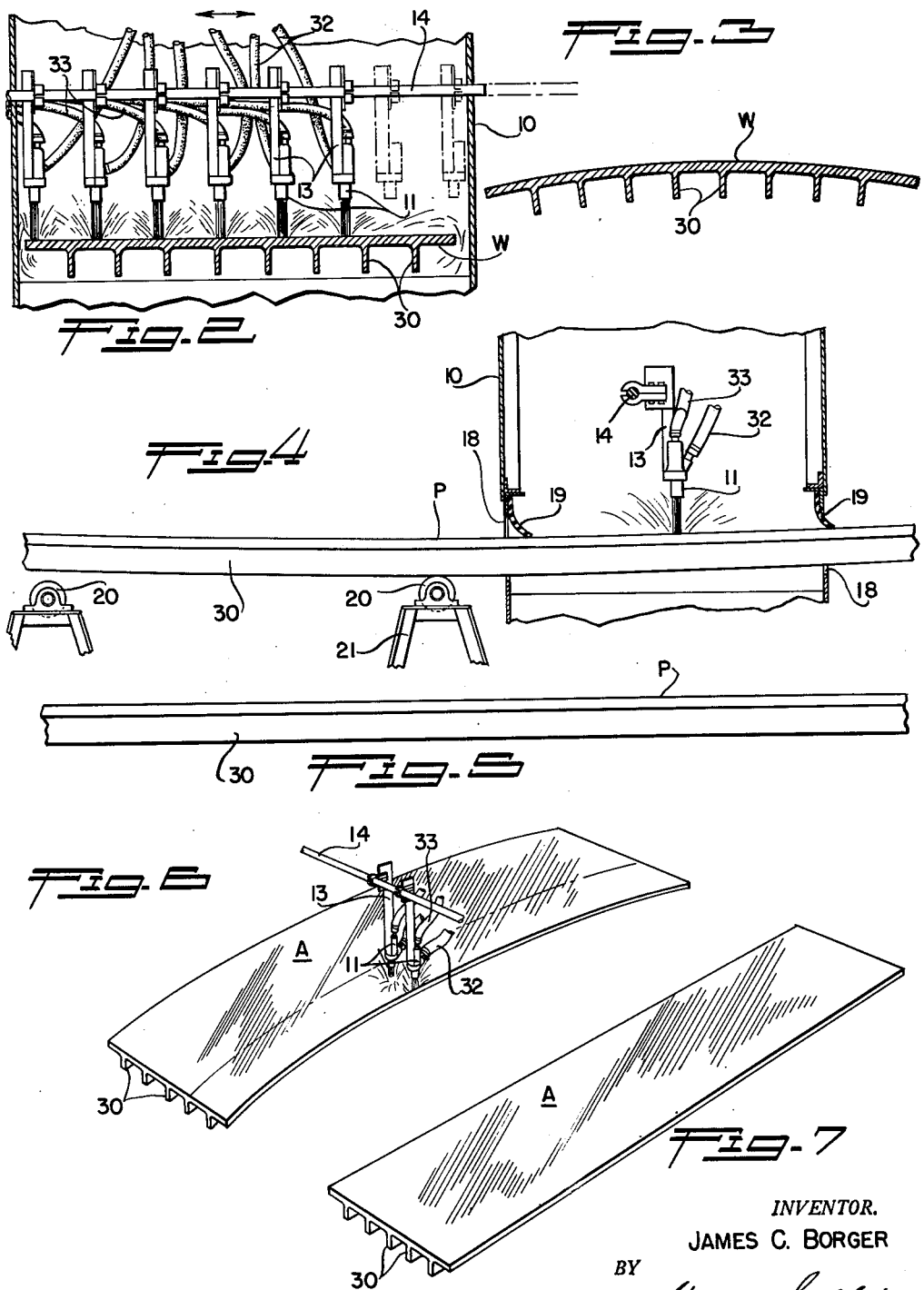
INVENTOR.
JAMES C. BORGER
BY
George C. Sullivan
Agent of a typical apparatus and several manners of performing the method, wherein reference will be made to the accompanying drawings, in which:

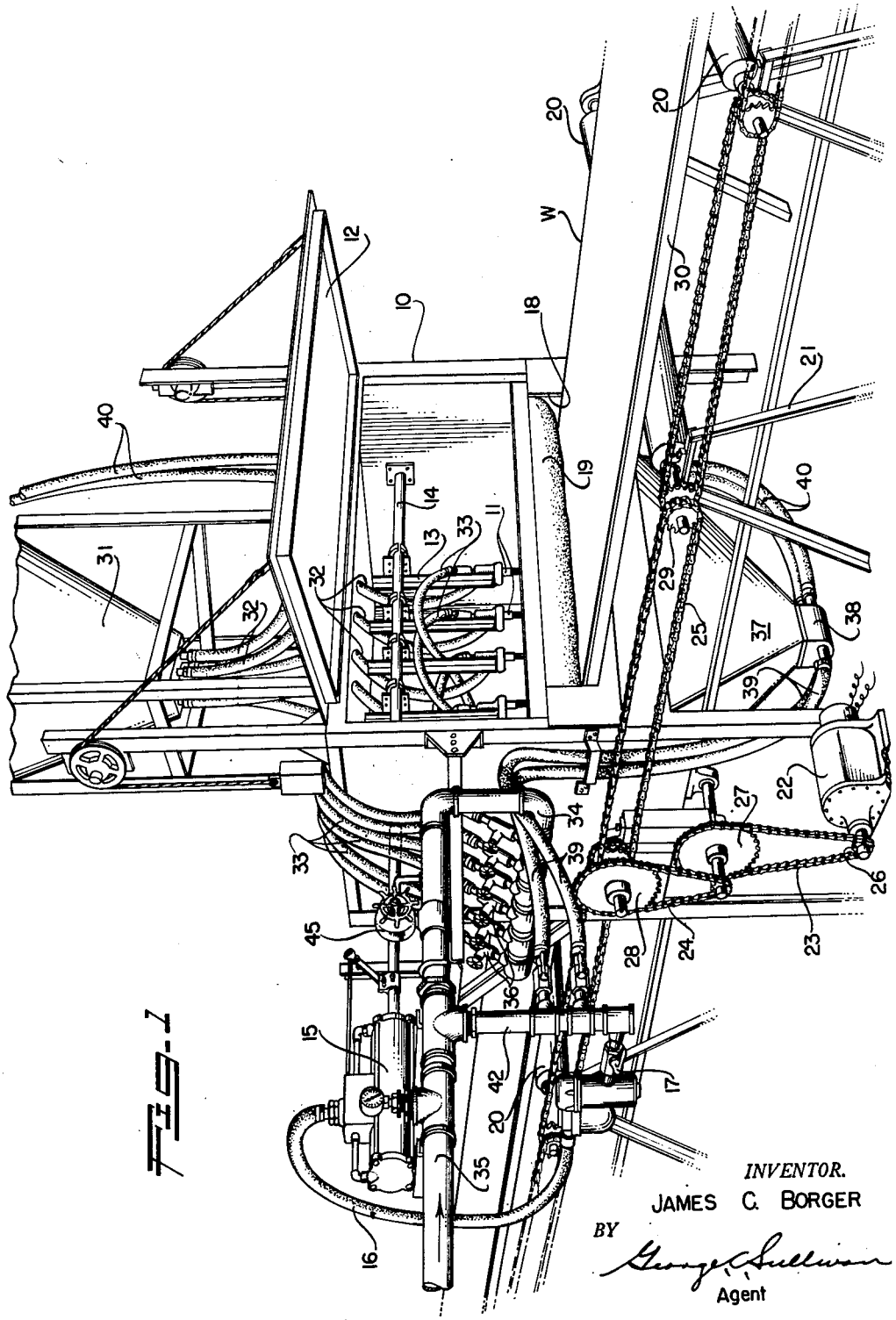

United States Patent Office 2,701,408
Patented Feb. 8, 1955

2,701,408

METHOD OF COLD FORMING SHEETS

James C. Borger, Burbank, Calif., assignor to Lockheed Aircraft Corporation, Burbank, Calif.

Application November 19, 1951, Serial No. 257,166

3 Claims. (Cl. 29—90)

This invention relates to the art of metal forming and relates more particularly to methods and apparatus for shaping or forming metal sheets and plates.

While the invention has a wide range of application, it is especially useful in the forming of aluminum alloy sheets or plates where compressive stresses are desirable or required in the surface fibers to avoid what is termed "stress corrosion." Certain materials, such as 75 S–T6 aluminum alloys, are particularly susceptible to this stress corrosion which results when a surface region of the part is left with tensile stresses as a consequence of subjecting the part to conventional forming processes. The invention is also applicable to the straightening and forming of integrally stiffened aluminum alloy sheets and plates where the material is not adapted to be formed by stretch forming procedures and where the construction of suitable dies is difficult and costly. Such integrally stiffened parts are employed in the fabrication of aircraft, and comprise sheets or plates of aluminum alloy having integral stiffening or reinforcing ribs, or the like, on one surface. It is a general object of this invention to provide a simple, effective and commercially practical method for successfully cold forming such parts.

Another object of the invention is to provide a method of this character wherein one or both surfaces of the part are subjected to the peening action of one or more blasts or jets of shot, or the like, to produce compressive stresses in the surface regions or fibers of the part. The compressive stresses thus induced on one side of the material or part produce a convexity at that side and a concave opposite surface, thus shaping or cold forming the part without subjecting any of its surface regions to tensile stresses that are so undesirable in materials subject to stress corrosion. Where one surface is treated by the shot peening blasts, its surface fibers are put under compression and that side of the part is made convex while the opposite side is simultaneously made concave so that its surface fibers are in a neutral state or are also under compression. Of course, in cases where both sides of the part are shot peened, the surface fibers at both sides are put under compressive stresses.

Another object of the invention is to provide a method of this character that may be readily controlled to give the part or work the intended or desired contour. The contour of the part is determined by the intensity or velocity of the shot blast, the size of the shot or peening material, and the time or duration of the peening of the part or given areas thereof. Each of these factors may be varied or selected to obtain the required shape or contour of the work.

Another object of the invention is to provide a method of this kind that is effective in straightening sheets, etc. that are warped as a result of residual stresses produced therein during the rolling or initial processing of the material, or as a result of machining the integral reinforcing ribs on one side of the sheet.

A further object of the invention is to provide a practical, readily controllable machine or apparatus for performing the herein described method.

Other objectives and features of the invention will become apparent from the following detailed description of a typical apparatus and several manners of performing the method, wherein reference will be made to the accompanying drawings, in which:

Figure 1 is a perspective view of the apparatus or machine employed in the shot peening of the work;

Figure 2 is a more or less diagrammatic vertical sectional view of the apparatus illustrating the shot blasts impinging against the work part;

Figure 3 is a transverse sectional view of the work part as contoured by the method of the invention;

Figure 4 is a diagrammatic fragmentary vertical sectional view illustrating the manner of treating or peening a work part that has become warped, for example as a result of machining integral ribs thereon;

Figure 5 is a fragmentary edge elevation of the work part as straightened in accordance with Figure 4;

Figure 6 is a diagrammatic perspective view illustrating the manner of treating or processing a piece of work that is warped, for example as a result of residual stresses therein; and Figure 7 is a perspective view of the work part of Figure 6 after being straightened in accordance with the method of the invention.

The apparatus employed in carrying out the method may, of course, be varied in character, depending upon the size, shape and nature of the work or parts to be formed. In the drawings, I have shown a typical apparatus of the invention suitable for shaping or forming integrally stiffened skins for aircraft. The apparatus includes a rectangular cabinet 10 housing a plurality of nozzles 11. The cabinet 10 has a door 12 which may be raised, as shown in Figure 1, to give access to the nozzles 11 and other parts. The nozzles 11 are vertically arranged in a row and are directed downwardly. The sheet or work W is fed or advanced through the cabinet 10 under the nozzles 11, as will be more fully described, and it is often desirable to move or reciprocate the nozzles 11 transversely of the work as it advances. Accordingly, the nozzles 11 are secured to the lower ends of vertical members 13 which, in turn, are attached to a horizontal reciprocable rod 14. The rod 14 extends through the cabinet 10 and a cylinder and piston mechanism 15 is connected with one projecting end of the rod to reciprocate the rod and nozzles 11. The mechanism 15 is supplied with operating air pressure by a line 16 controlled by a valve 17. Beneath the above mentioned door 12, and in the opposite wall of the cabinet 10, are openings 18 for admitting or passing the work W, and flaps or aprons 19 of rubber, fabric, or the like, are provided at these openings to engage or wipe against the work to prevent the escape of shot from the cabinet. This is best illustrated in Figure 4.

The work W is fed or advanced through the openings 18 of the cabinet 10 to pass beneath the nozzles 11. Any appropriate means may be employed to support and advance the workpiece. As illustrated, this means comprises a series of spaced horizontal rollers 20 carried by a suitable supporting structure 21. The rollers 20 are rotated by an electric motor 22 which drives the rollers through a system of chains 23, 24 and 25 and sprockets 26, 27, 28 and 29. Where the work W is to be given a transverse curvature or contour, as illustrated in Figure 3, it is arranged with its ribs 30 resting on the rollers 20 and with its plain surface facing upwardly to be acted upon by the shot blasts from the nozzles 11. It is to be understood that while I have shown a workpiece having ribs on one surface, the method and apparatus are also adapted to form sheets, panels, and the like, having ribs or projections on both sides.

The shot, or other material, for the peening operations is contained in a hopper 31 located above the cabinet 10 and lines or hoses 32 lead downwardly from the hopper to the individual nozzles 11. Individual air lines or hoses 33 also lead to the nozzles 11 and discharge therethrough to drive the shot from the nozzles in the form of high velocity streams or jets. The air lines 33 extend to a manifold pipe 34 which, in turn, is connected with a main air pressure supply pipe 35. Valves 36 control the individual lines or hoses 33 and a pressure regulating valve 45 is provided in the supply pipe 35 upstream from the hoses 33 so that the velocity or intensity of the peening blasts may be controlled, as required. The spent peening material, or shot, falls downwardly at the edges of the work W to enter a hopper 37 located below the cabinet 10. Ejector means 38 are provided at the lower end of this hopper 37 to receive and then discharge the peening material or shot. Air pressure lines 39 lead to the ejector means 38 and shot hoses or lines 40 extend from the ejector means to the upper end of the upper hopper 31, the air pressure from the lines 39 serving to eject or "pump" the shot up to the hopper 31. The air pressure lines 39 of the ejector means 38 lead from a branch 42 of the main air pressure supply pipe 35. This branch 42 may also supply air under pressure to the above described line or hose 16 of the cylinder and piston mechanism 15.

This method of the invention will be described as performed or carried out with the machine, just described, it being apparent that the apparatus may be varied considerably to handle work parts of different shapes, etc. and that materially different machines or apparatus may be used without departing from the invention. The peening material employed in the method, which I will term "shot," may be chilled iron shot, cut steel wire particles, or any other suitable material of the required hardness. The cut wire particles that have been treated to remove the sharp corners, may be preferred as this material leaves the work W clean and substantially free of dust, and the like. The size of the shot may be varied between .250" and .015" depending upon the particular workpiece and the nature of the forming to be performed. The air pressure supplied to the nozzles 11 to eject the shot may range between 16 and 49 p. s. i. and the intensity of the shot blasts may be between .0035 and .009 on the Almen A2 scale. The work W is fed or advanced through the cabinet 10 and under the shot blasting nozzles 11 at a rate of from 5 to 7 inches per minute and preferably at a rate of about 6 inches per minute. Where the nozzles 11 are reciprocated transversely of the advancing work W, they may be moved at the rate of from 50 to 60 complete strokes or cycles per minute. As previously noted, these several weights, pressures, speeds, rates, etc. may be regulated, controlled, varied and related to obtain the selected or required forming of the work W.

In performing the method to shape or form an integrally stiffened sheet or skin W of 75 S–T6 aluminum alloy, or the like, of the character illustrated in Figures 1 and 2, to a shape or condition such as illustrated in Figure 3, the work W is placed on the rollers 20 in the front of the cabinet 10 and air pressure is supplied to the nozzles 11 to eject or discharge the shot in the form of high velocity jets or blasts of the selected intensity. The work W is arranged with its plain side facing upwardly and with its stiffening ribs 30 resting on the rollers 20. In practice, the thickness of the work W, that is the thickness of the main web of the work, may vary between .055 and 0.50 inch. The rotating rollers 20 advance the work W into and through the cabinet 10 at a constant rate and, as the work moves through the cabinet, the blasts of shot from the reciprocating nozzles 11 impinge against and peen the upper surface of the work. The reciprocation of the nozzles 11 directing the peening blasts against the slowly advancing work W assures the substantially uniform peening of the entire upper surface of the work part. The shot peening of the upper or plain surface of the work W creates compressive surface stresses therein. These compressive stresses in the surface fibers at the plain side of the work W produce a convexity of this surface and the opposite side of the work is made concave, the entire cross section of the work W being cold formed or contoured as a result of the peening action. The entire workpiece W is fed or passed through the cabinet 10 to be acted upon by the peening blasts. In actual practice, the work W does not take on the full final contour until the major portion of its length has been peened, the unpeened or unformed portion resisting the change in shape until this time. Figure 3 illustrates a typical transverse curvature of the work W, on a somewhat exaggerated scale, obtained by the method of the invention. In some instances, a single pass of the work W under the peening nozzles 11 will suffice to give the part or work the desired contour. In other cases, it may be necessary or desirable to subject the work W to two or more passes under the peening nozzles 11. It is to be particularly noted that the cold forming of the work W, in accordance with the method of this invention, results in the creation of compressive stresses in the surface region or surface fibers at the plain side of the work while at the same time producing some compression, as a result of the shaping of the part, at the inner surface or at least leaving the fibers at the inner surface of the work in a neutral condition. Thus there are no areas or regions of the work W left with residual tensile stresses liable to subsequently cause stress corrosion of the work. In the event the work W is overformed as a result of the procedure just described, that is in case the work is given an excessive transverse curvature, the work is inverted so that its plain side rests on the rollers 20 and its webs 30 face upwardly. The work is passed beneath the peening nozzles 11 one or more times in this position. This peening of the ribbed side of the work W may be done at a less peening intensity or at any selected intensity sufficient to remove some of the curvature of the work and restore it to the selected or required shape. It is to be observed that no special, expensive dies are required to form the work parts and that the peening apparatus may be employed to shape or form parts of various characters, sizes, etc.

The method of the invention is useful in the straightening of work parts that have become warped or misshapen as a result of certain machining operations or as a result of stresses developed in the material of the part at the time it was initially rolled. Frequently, it is found that the machining of the ribs 30 on the work part cause the work to curl or bow so that its plain surface is concave and its ribbed side is convex, the curvature being longitudinally of the workpiece. This is readily corrected by the method of the invention. As illustrated in Figure 4, such a warped workpiece P is fed through the machine or apparatus with its plain side facing upwardly to be acted upon by the peening blasts from the nozzles 11. The compressive stresses produced in the surface fibers at the upper or plain side of the workpiece P remove the distortion or warp in the piece and cause it to return to the straight condition shown in Figure 5. The workpiece P may be passed through the peening cabinet 10 one or more times to fully remove the warp or distortion.

Oftentimes when a workpiece is cut from a plate or sheet which, of itself, was substantially straight and flat, the residual stresses in the material resulting from the rolling operations at the time of its manufacture, are unbalanced and the workpiece is warped by these unbalanced stresses. This distortion is often such that one longitudinal edge of the workpiece is concave and the opposite longitudinal edge is convex, the part being substantially flat to occupy a single common plane but having longitudinally curved opposite edges. Figure 6 of the drawings illustrates such a workpiece A, the distortion being somewhat exaggerated. To cure or remove this condition, one edge portion of the workpiece A is subjected to shot peening with the apparatus of the invention. Thus, as diagrammatically illustrated in Figure 6, the workpiece A is fed under one or more peening nozzles 11 so that the peening blasts act on a surface of the part A adjacent the edge that is at the internal circumference at the longitudinal warp. This may be accomplished by employing only one or two nozzles 11 at one end of the row of nozzles and passing the workpiece A through the cabinet 10 in a manner to have its surface at the internal circumference of the warp pass under the active nozzles. The workpiece is then inverted and the region of the opposite surface adjacent the same edge is subjected to the action of the shot peening blasts from one or more nozzles. In other words, the work A is passed through the machine to have its opposite sides shot peened along and adjacent to the edge at the internal circumference of the warp. The workpiece A may be passed through the cabinet 10 one or more times to establish the required compressive stresses in the surface fibers along the edge at the internal circumference of the warp. These compressive stresses in the surface fibers or regions of the workpiece A restore the piece to the condition where the stresses are balanced and the workpiece is straightened.

Having described only typical forms of the invention I do not wish to be limited to the specific details herein set forth, but wish to reserve to myself any variations or modifications that may appear to those skilled in the art and fall within the scope of the following claims.

I claim:

1. The method of flattening a warped sheet-like metal part having warped concave and convex longitudinal surfaces which comprises feeding one end of said sheet concave side up under a shot peener, directing streams of shot against said concave side, and gradually moving said part lengthwise beneath said peener so that said part is successively peened from said one end to the other thereby removing said warping and thus flattening said part.

2. The method of straightening a flat sheet-like metal part having its longitudinal edges warped in the same direction, which comprises feeding that edge portion of said sheet adjacent said concave edge into a shot peening apparatus, directing streams of shot against said edge portion, and gradually moving said edge portion lengthwise through said apparatus so that said edge portion is successively peened from said one end to the other thereby removing said warping and thus straightening said part.

3. The method of reshaping an elongate sheet-like metal part having longitudinally extending integral stiffening ribs on one side surface and having its opposite surface plain, which comprises feeding one end of said sheet under a shot peener, directing streams of shot against said plain surface, moving said streams of shot transversely across said plain surface continuously from one side to the other, and gradually moving said part lengthwise beneath said peener from said one end to the other thus reshaping said part.

References Cited in the file of this patent

UNITED STATES PATENTS

| Number | Name | Date |
|---|---|---|
| 1,605,730 | Hoevel | Nov. 2, 1926 |
| 1,907,198 | Hull | May 2, 1933 |
| 1,946,340 | Vorwerk | Feb. 6, 1934 |
| 1,985,332 | Ward et al. | Dec. 25, 1934 |
| 2,132,311 | Minich | Oct. 4, 1938 |
| 2,234,850 | Wallace | Mar. 11, 1941 |
| 2,239,044 | Leighton | Apr. 22, 1941 |
| 2,252,823 | Wallace | Aug. 19, 1941 |
| 2,338,591 | Learmonth | Jan. 4, 1944 |
| 2,458,686 | Davie, Jr. | Jan. 11, 1949 |
| 2,489,877 | Fowler | Nov. 29, 1949 |
| 2,520,566 | Sargrove | Aug. 29, 1950 |

OTHER REFERENCES

Shot Peening and the Fatigue of Metals by H. F. Moore. Published by American Foundry Equipment Co., Mishawaka, Indiana, 1944.